United States Patent
Shin

(10) Patent No.: US 10,162,786 B2
(45) Date of Patent: Dec. 25, 2018

(54) STORAGE NODE BASED ON PCI EXPRESS INTERFACE

(71) Applicant: SK hynix Inc., Gyeonggi-do OT (KR)

(72) Inventor: Seong Won Shin, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 175 days.

(21) Appl. No.: 14/956,063

(22) Filed: Dec. 1, 2015

(65) Prior Publication Data
US 2016/0154765 A1 Jun. 2, 2016

Related U.S. Application Data

(60) Provisional application No. 62/086,010, filed on Dec. 1, 2014.

(51) Int. Cl.
G06F 13/42 (2006.01)
G06F 13/40 (2006.01)

(52) U.S. Cl.
CPC ...... *G06F 13/4282* (2013.01); *G06F 13/4022* (2013.01); *G06F 13/4081* (2013.01)

(58) Field of Classification Search
None
See application file for complete search history.

(56) References Cited

U.S. PATENT DOCUMENTS

| | | | | |
|---|---|---|---|---|
| 8,296,476 B2* | 10/2012 | Zhang | ............ | G06F 3/0626 710/17 |
| 8,694,709 B2* | 4/2014 | Loffink | ............ | H01R 13/70 361/679.33 |
| 9,037,786 B2* | 5/2015 | Asnaashari | ............ | G06F 12/0246 711/103 |
| 2007/0097948 A1* | 5/2007 | Boyd | ............ | G06F 13/4004 370/351 |
| 2008/0147959 A1* | 6/2008 | Freimuth | ............ | G06F 12/1009 711/100 |
| 2010/0115174 A1* | 5/2010 | Akyol | ............ | G06F 13/385 710/316 |
| 2010/0254100 A1* | 10/2010 | Kim | ............ | H05K 7/1461 361/752 |
| 2013/0259053 A1* | 10/2013 | Sato | ............ | H04L 49/15 370/400 |
| 2014/0047156 A1* | 2/2014 | Billi | ............ | G06F 13/4022 710/314 |
| 2014/0229659 A1 | 8/2014 | Jones | | |
| 2014/0289434 A1 | 9/2014 | Ranganathan et al. | | |
| 2014/0372662 A1* | 12/2014 | Evans | ............ | G06F 13/4022 710/316 |
| 2015/0019798 A1 | 1/2015 | Huang | | |

(Continued)

FOREIGN PATENT DOCUMENTS

WO   WO 2013/184923   12/2013

*Primary Examiner* — Henry Tsai
*Assistant Examiner* — Aurangzeb Hassan
(74) *Attorney, Agent, or Firm* — IP & T Group LLP

(57) ABSTRACT

A storage node includes a storage element module. The module includes a first peripheral component interconnect express (PCIe) switch suitable for uplink connection, a second PCIe switch coupled to the first PCIe switch, and at least one connection element coupled to the second PCIe switch, suitable for coupling with at least one storage element. All PCIe end point elements and uplink connection elements are in a PCIe card form factor as defined in PCI Express Card Electromechanical Specification.

19 Claims, 10 Drawing Sheets

(56) References Cited

U.S. PATENT DOCUMENTS

| | | | |
|---|---|---|---|
| 2015/0095712 A1* | 4/2015 | Han | G11C 29/1201 |
| | | | 714/42 |
| 2015/0120969 A1 | 4/2015 | He et al. | |
| 2015/0186319 A1* | 7/2015 | Blevins | G06F 13/4068 |
| | | | 710/301 |
| 2015/0236700 A1* | 8/2015 | Townley | G06F 1/10 |
| | | | 326/38 |

* cited by examiner

STORAGE NODE BASED ON PCI EXPRESS INTERFACE

CROSS-REFERENCE TO RELATED APPLICATIONS

This application claims the benefit of U.S. Provisional Application No. 62/086,010, filed Dec. 1, 2014, the entire contents of which are incorporated herein by reference.

BACKGROUND

1. Field

Exemplary embodiments of the present disclosure relate to a storage node supporting peripheral component interconnect express (PCIe) interface.

2. Description of the Related Art

Storage disk array systems have been used to maximize the efficiency and the performance of individual disk drives by aggregating the disk drives as a pool of storage resources. Two common legacy disk drive serial interfaces are Serial ATA (SATA) and Serial Attached SCSI (SAS). Both conventional standard hard disk drives (HDDs) and solid state disk drives (SSDs) share the common type of such electrical and mechanical Interfaces.

Recently, peripheral component interconnect express (PCIe) based Solid State Disk (SSD) had been standardized as the NVMe specification. The PCIe Interface to the disk drives therefore enables an efficient fabric choice for the array appliances.

SUMMARY

Embodiments of the present disclosure are directed to a storage node including a storage elements module supporting peripheral component interconnect express (PCIe).

In accordance with an embodiment of the present invention, a storage node includes a storage element module. The module includes a first peripheral component interconnect express (PCIe) switch suitable for uplink connection, a second PCIe switch coupled to the first PCIe switch, and at least one connection element coupled to the second PCIe switch, suitable for coupling with at least one storage element. All PCIe end point elements and uplink connection elements are in a PCIe card form factor as defined in PCI Express Card Electromechanical Specification.

DETAILED DESCRIPTION

Figure 1:
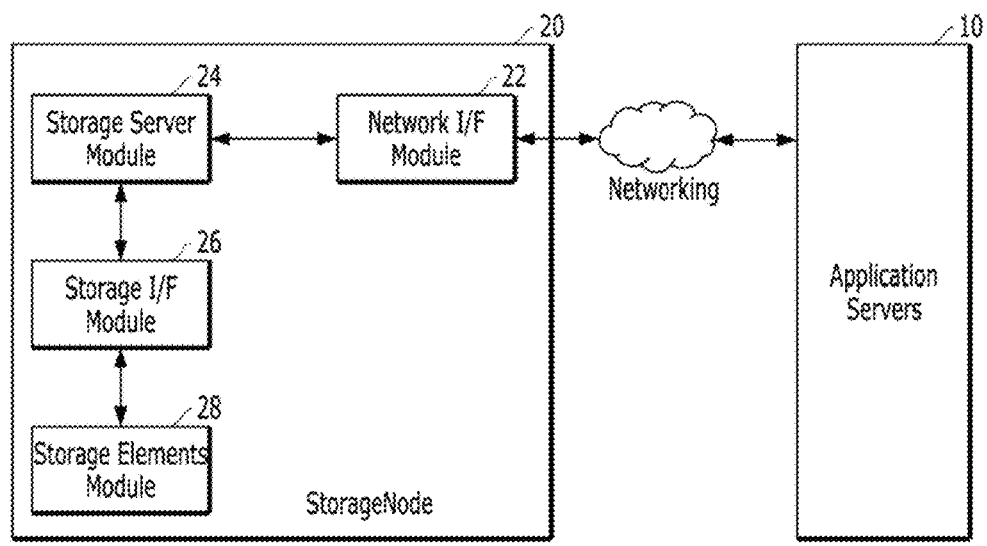
FIG. 1 is a diagram of a system including a storage node in which embodiments of the present invention are applied.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Embodiments of the present invention are described herein which provide a cost-effective solution to achieve versatile application specific deployment options as a PCIe fabric based SSD array storage node that has massive number of standard PCIe mechanical slots optimized for half-height (low profile) half-length (HHHL) PCIe add-in cards for flash storages and their accelerations. The standard PCIe slot based storage expansion appliance enables various efficient configurations to form a flash array storage node for Direct Attached Storage (DAS), Storage Area Network (SAN) and Network Attached Storage (NAS) applications.

FIG. 1 is a diagram of a system including a storage node in which embodiments of the present invention are applied.

Referring to FIG. 1, the system includes an application server or application servers 10 and a storage node 20 such as a large scale flash array storage node. The storage node 20 is coupled to the application server 10. The storage node 20 includes a network interface (I/F) module/card (NIC) 22, a storage server or controller module (SSM) 24, a storage interface module (SIM) 26, and a storage elements module (SEM) 28. In some embodiments, the SSM 24 includes one or more central processing units (CPUs) with its tightly coupled components such as a dynamic random access memory (DRAM), essential to run the storage node 20 and the networking related software (S/W) stacks on top of basic operating system environment with its own optional network interfaces. The network interfaces provide connections to other application servers.

A client (not shown) of the application specific servers may request storage related services to the application server 10. The application server 10 may direct the requests to the storage node 20 to access physical storages inside the storage node 20. The system may act as an application server to the clients directly not through other servers. It depends on the task allocation on the storage server, which may depend on the computing power and the configuration needs.

Depending on the implementation configuration of the system, the functional entities shown in the FIG. 1 can be in physically separate chasses interconnected via external cables between the SSM 24 and the SEM 28. In some applications, mappings would be possible not just 1:1 between the SSM 24 and the SEM 28 but M:N, where M≤N for storage capacity oriented applications and M>N for processing(performance) oriented applications.

Figure 2:
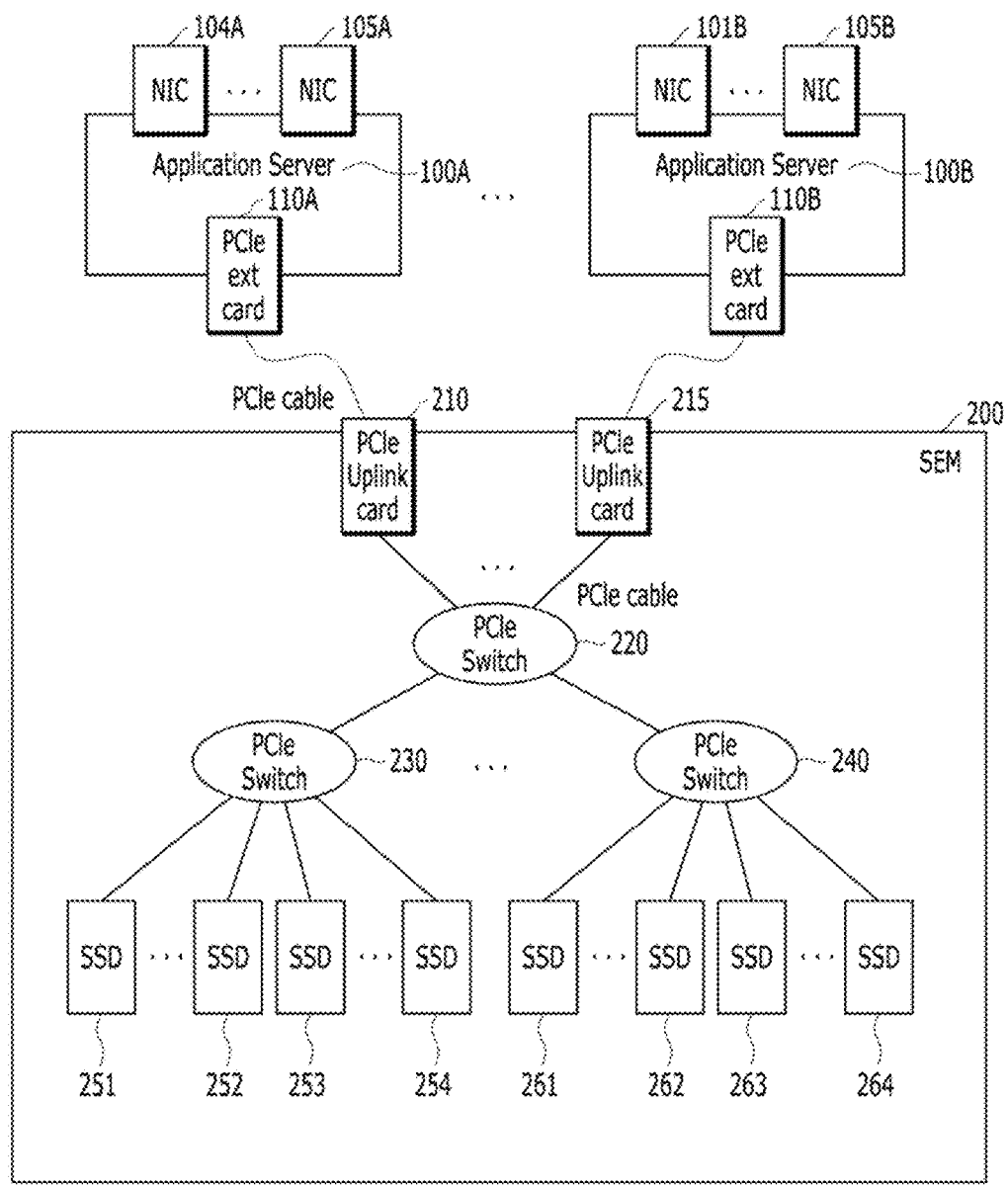
FIGS. 2, 3, and 4 are diagrams illustrating a storage elements module (SEM) in accordance with embodiments of the present invention.
Figure 3:
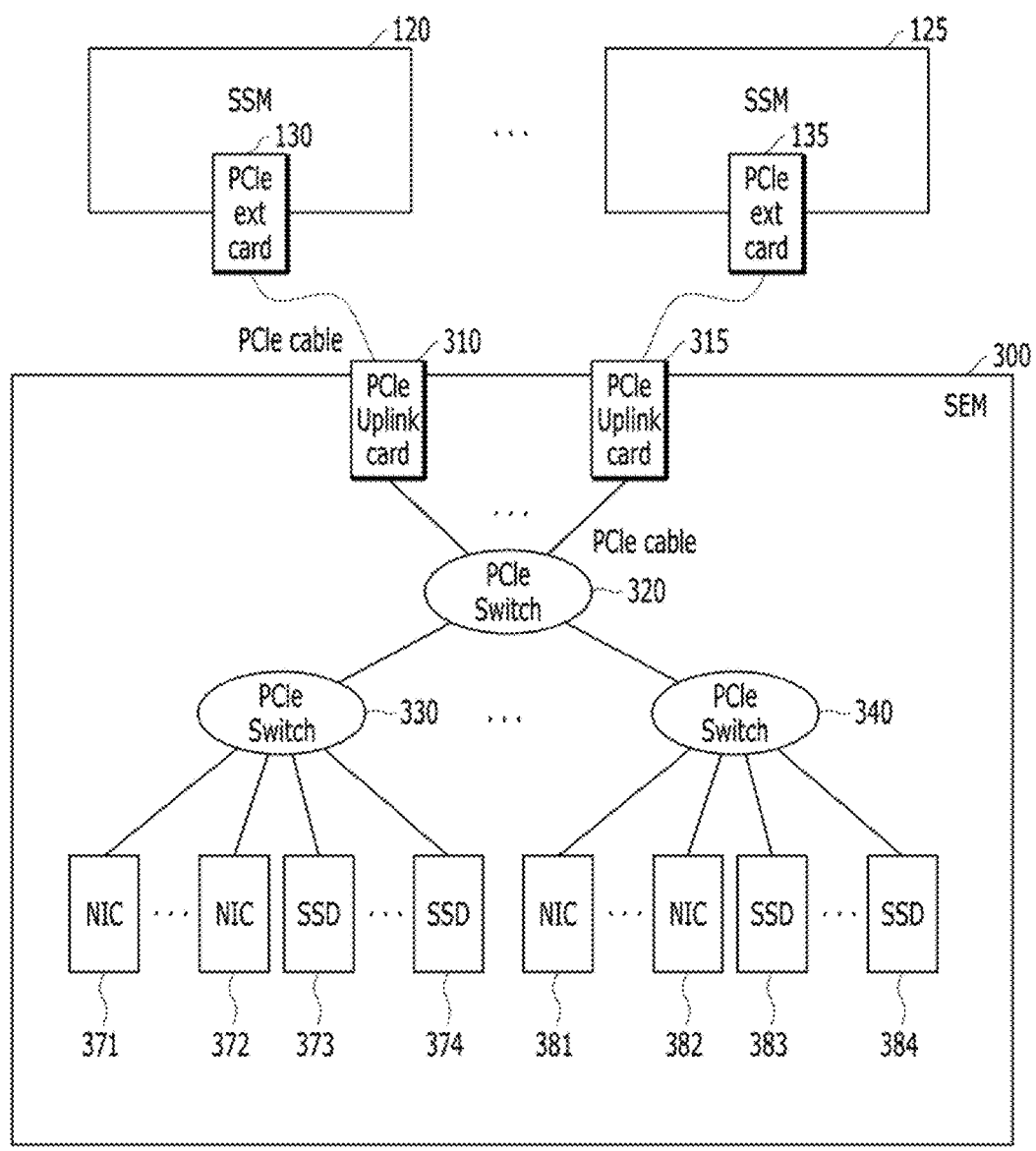
Figure 4:
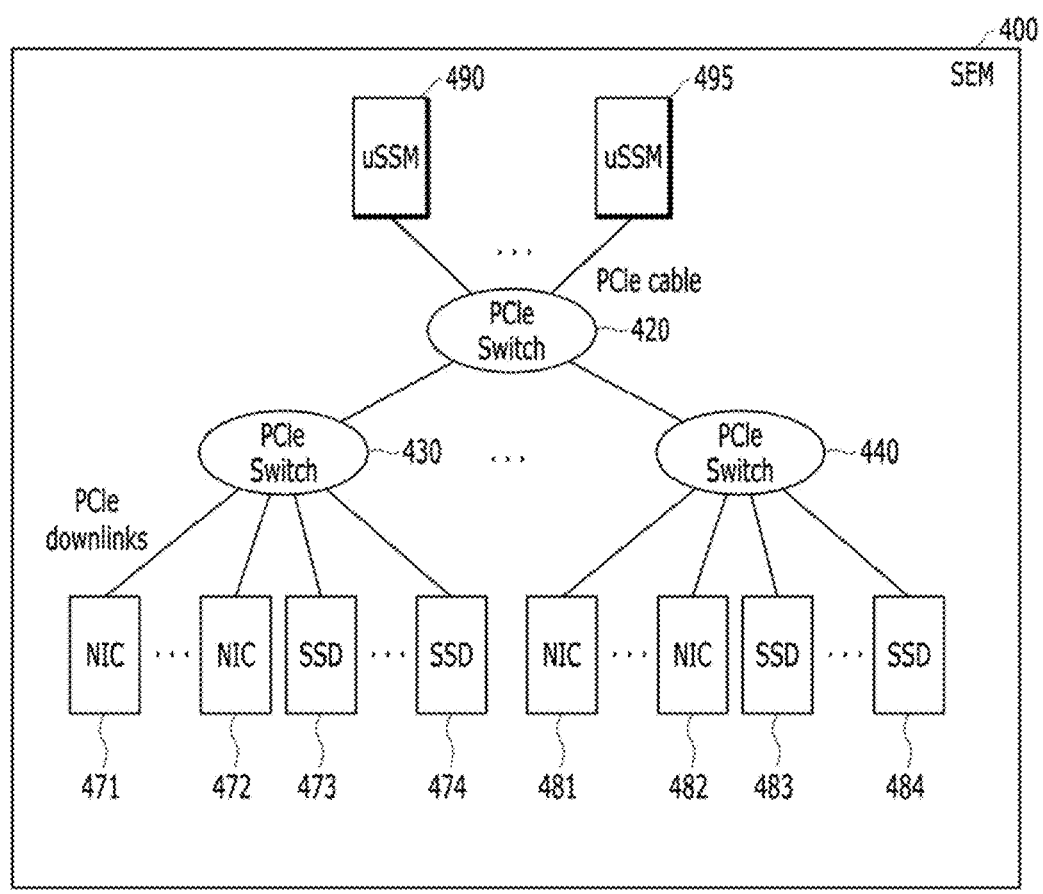

FIG. 2 through FIG. 4 show various embodiments of possible configurations of the system of FIG. 1. The circular elements 220, 230, 240, 320, 330, 340, 420, 430 and 440 are PCIe switch fabric devices with multiple PCIe ports that are configured to provide different numbers of lanes per port. The leaves of the PCIe fabric tree structure are the flash storage elements depicted as SSD in a single PCIe gen 3 slot, which is connected with N×(x4) links.

FIG. 2 illustrates a direct attached storage (DAS) configuration where a storage elements module (SEM) 200 is directly attached to one or more application server(s) 100A, 100B via PCIe extenders 110A, 110B, 210, 215. The application server 100A, 100B may configured the array of flash storages 251-254, 261-264 allocated to it as just bunch of SSD disks (JBOD). In this configuration, the role of SSM is replaced by the application servers.

Referring to FIG. 2, the SEM 200 includes peripheral component interconnect express (PCIe) switches 220-240. The PCIe switch 220 is for uplink connection. PCIe uplink cards 210, 215 are coupled to the PCIe switch 220. The PCIe uplink card 210 is coupled to a PCIe extending card 110A through a PCIe cable. The PCIe switch 220 is coupled to an application server 100A through the PCIe uplink card 210, the PCIe cable and the PCIe extending card 110A.

The PCIe uplink card 215 is coupled to a PCIe extending card 110B through a PCIe cable. The PCIe switch 220 is coupled to an application server 100B through the PCIe uplink card 215, the PCIe cable and the PCIe extending card 110B. The application server 100A includes network interface cards (NICs) 101A, 105A, and the application server 100B includes NICs 101B, 105B.

The PCIe switches 230, 240 are configured for coupling with a plurality of solid state drives (SSDs) 251-254, 261-264 as at least one storage element. The SSDs 251-254 are coupled to the PCIe switch 230 through connection elements (e.g., PCIe slots of FIG. 6). The SSDs 261-264 are coupled to the PCIe switch 240 through connection elements (e.g., PCIe slots of FIG. 6).

FIG. 3 illustrates one or more external storage server modules (SSMs) 120, 125 for a storage elements module (SEM) 300.

Referring to FIG. 3, the SEM 300 includes peripheral component interconnect express (PCIe) switches 320-340. The PCIe switch 320 is for uplink connection. PCIe uplink cards 310, 315 are coupled to the PCIe switch 320. The PCIe uplink card 310 is coupled to a PCIe extending card 130 through a PCIe cable. The PCIe switch 320 is coupled to the SSM 120 through the PCIe uplink card 310, the PCIe cable and the PCIe extending card 130. The PCIe uplink card 315 is coupled to a PCIe extending card 135 through a PCIe cable. The PCIe switch 320 is coupled to the SSM 125 through the PCIe uplink card 315, the PCIe cable and the PCIe extending card 135.

The PCIe switches 330, 340 may be configured for coupling with a plurality of solid state drives (SSDs) 373-374, 383-384 as at least one storage element, and a plurality of network interface cards (NICs) 371-372, 381-382. The NICs 371-372 are coupled to the PCIe switch 330 through connection elements (e.g., PCIe slots of FIG. 6), and the SSDs 373-374 are coupled to the PCIe switch 330 through connection elements (e.g., PCIe slots of FIG. 6). The NICs 381-382 are coupled to the PCIe switch 340 through connection elements (e.g., PCIe slots of FIG. 6), and the SSDs 383-384 are coupled to the PCIe switch 340 through connection elements (e.g., PCIe slots of FIG. 6).

In this configuration, the SSM is responsible to present the array of the SSDs to the application servers in a SAN/NAS environment. Various value added S/W components are aggregated into the SSM. Installation of the network interface NICs is either on the SSM or on the SEM depending on the selection of the SSMs with the NIC capability. The SEM can hold NICs in one of the standard PCIe slots facing the front side of the appliance.

FIG. 4 illustrates one or more embedded micro storage server modules (SSMs) 490, 495 in a storage elements module (SEM) 400.

Referring to FIG. 4, the SEM 400 includes peripheral component interconnect express (PCIe) switches 420-440. The PCIe switch 420 is for uplink connection. The PCIe switch 420 is coupled to the micro SSM 490. The PCIe switch 420 is coupled to the micro SSM 495.

The PCIe switches 430, 440 are for coupling with a plurality of solid state drives (SSDs) 473-474, 483-484 as at least one storage element, and a plurality of network interface cards (NICs) 471-472, 481-482. The NICs 471-472 are coupled to the PCIe switch 430 through connection elements (e.g., PCIe slots of FIG. 6), and the SSDs 473-474 are coupled to the PCIe switch 430 through connection elements (e.g., PCIe slots of FIG. 6). The NICs 481-482 are coupled to the PCIe switch 440 through connection elements (e.g., PCIe slots of FIG. 6), and the SSDs 483-484 are coupled to the PCIe switch 440 through connection elements (e.g., PCIe slots of FIG. 6).

In this configuration, the SEM 400 becomes a self-contained array node requiring no external SSMs. The network interface NICs are installed in one or more of the standard slots, of which interface ports are available from the faceplate of the SEM appliance. The embedded micro SSM in this case is similar to a PCIe form factor single board computer (SBC). The resulting unit is called as a self-contained storage node unit, which works as a pool of the flash array storages with embedded storage controller(s).

Figure 5:
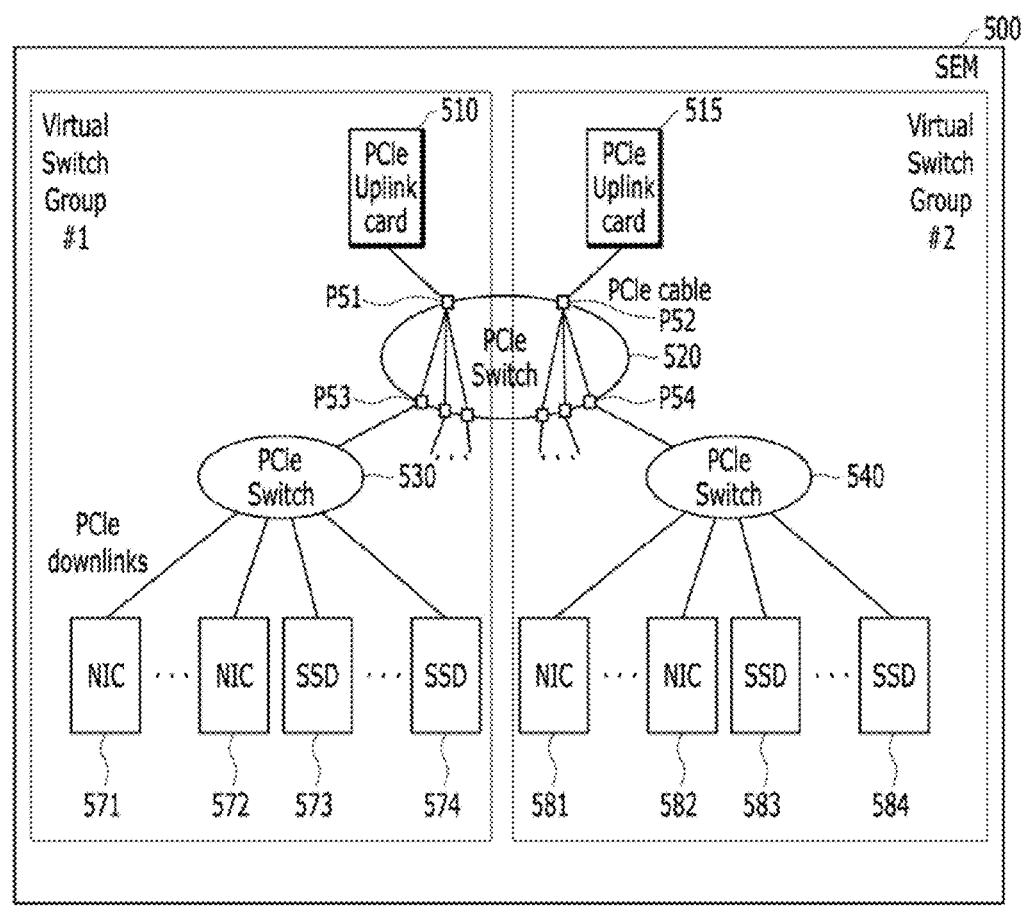
FIG. 5 is a diagram illustrating an example of partition structure of a storage elements module (SEM) in accordance with embodiments of the present invention.

FIG. 5 is a diagram illustrating an example of partition structure of a storage elements module (SEM) 500 in accordance with embodiments of the present invention.

Referring to FIG. 5, the SEM 500 includes peripheral component interconnect express (PCIe) switches 520-540. The PCIe switch 520 is for uplink connection. PCIe uplink cards 510, 515 are coupled to the PCIe switch 520.

The PCIe switches 530, 540 are for coupling with a plurality of solid state drives (SSDs) 573-574, 583-584 as at least one storage element, and a plurality of network interface cards (NICs) 571-572, 581-582. The NICs 571-572 are coupled to the PCIe switch 530 through connection elements (e.g., PCIe slots of FIG. 6), and the SSDs 573-574 are coupled to the PCIe switch 530 through connection elements (e.g., PCIe slots of FIG. 6). The NICs 581-582 are coupled to the PCIe switch 540 through connection elements (e.g., PCIe slots of FIG. 6), and the SSDs 583-584 are coupled to the PCIe switch 540 through connection elements (e.g., PCIe slots of FIG. 6).

One uplink port is assigned to a group of the SSDs (and optional cards 571-572 inside the SEM 500) which belongs to the partitioned group. For example, uplink port P51 is assigned to a group of the SSDs 573-574 and network interface cards (NICs) 571-572 which belong to the partitioned first group. Uplink port P52 is assigned to a group of the SSDs 583-584 and network interface cards (NICs) 581-582 which belong to the partitioned second group. The uplink PCIe switch fabric 520 at the top of the tree is capable of providing a virtual switch mode which can partition its ports to form a virtual switch so that each group can work independently with its own uplink controller. In the example, only two partitions are depicted, but the switch fabric device may provide up to four partitions. All other switch fabric devices 530, 540 have a designated uplink to the uplink fabric device 520, thereby not needing any virtual switch mode configuration.

An SEM is a pool of many of the standard PCIe slots, where each slot provides x8 or x16 lanes. In this example, any PCIe add-in card which is plugged into a slot follows the PCI Express Card Electromechanical Specification, in the HHHL form factor. Due to the standard compliant slots, any application specific cards from a vendor can be installed in any slot position in addition to the storage cards. The uplink candidate slots which are not in use for the uplink operation can also be used for additional end-point slots, and it maximizes the usability of the slots and the switch ports.

Figure 6:
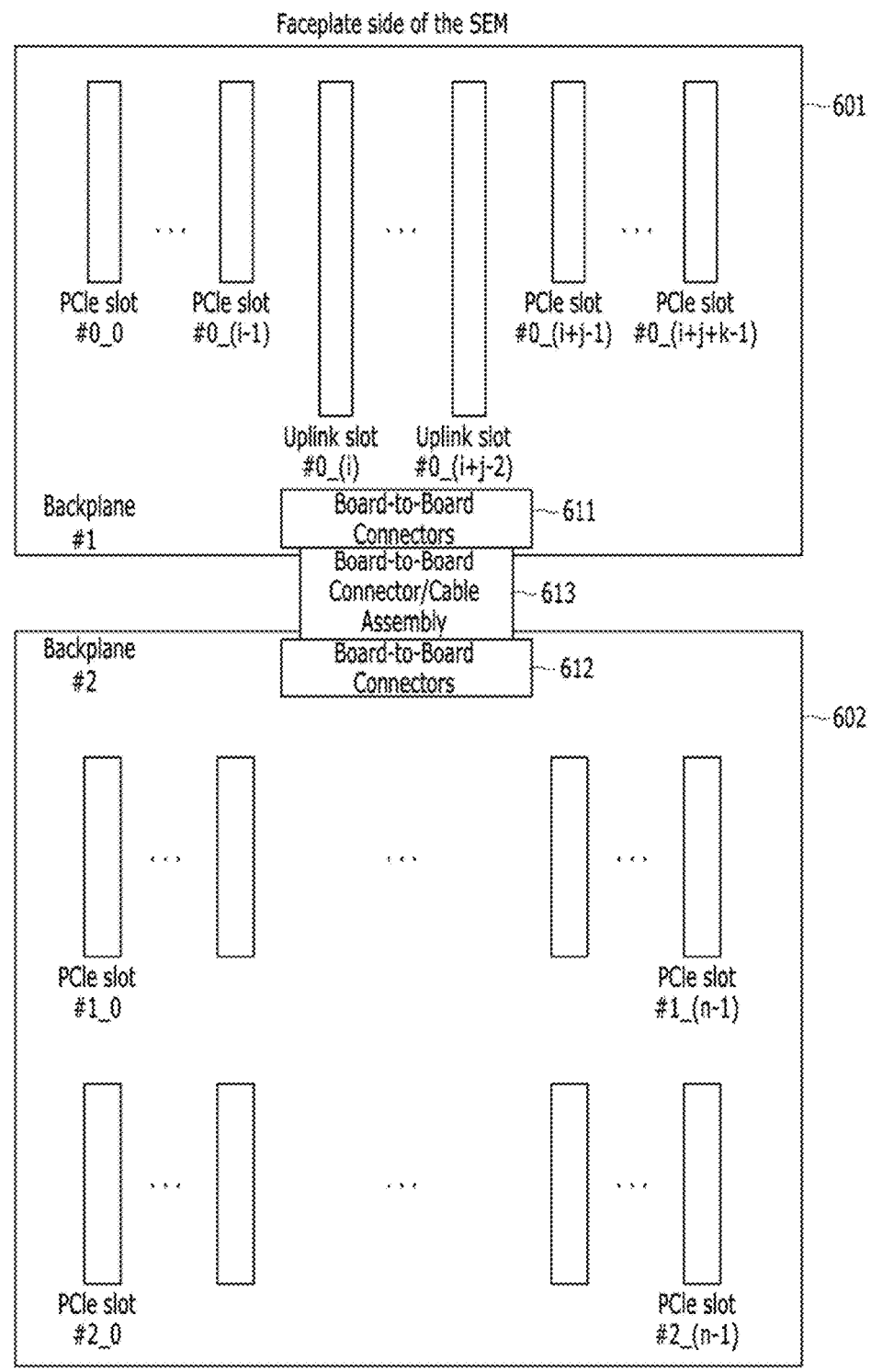
FIG. 6 is a diagram illustrating a slot arrangement of a storage elements module (SEM) in accordance with embodiments of the present invention.

FIG. 6 is a diagram illustrating a slot arrangement of a storage elements module (SEM) in accordance with embodiments of the present invention.

Referring to FIG. 6, in the faceplate side of the SEM, there are two backplanes 601, 602. The backplanes 601, 602 include a plurality of uplink slots (i.e., uplink slots #0_(i), #0_(i+j-2)) for coupling with an uplink PCIe switch (e.g., PCIe switch 320 of FIG. 3), and a plurality of PCIe slots (i.e., slots #0_(0), #0_(i-1), #0_(i+j-1), #0_(i+j+k-1), #1_(0), #1_(n-1), #2_(0), #2_(n-1)) for coupling with other PCIe switches (e.g., PCIe switches 330, 340 of FIG. 3). In the first backplane 601, the plurality of uplink slots #0_(i), #0_(i+j-2) and a portion of the plurality of PCIe slots #0_(0), #0_(i-1), #0_(i+j-1), #0_(i+j+k-1) are arranged. In the second backplane 602, a remaining portion of the plurality of PCIe slots #1_(0), #1_(n-1), #2_(0), #2_(n-1) are arranged. The first backplane 601 includes a connector 611, and the second backplane 602 includes a connector 612. The connector 611 and the connector 612 are connected through a board-to-board connector or cable assembly 613.

The longer slots represent uplink candidate slots with PCIe gen3 x16 lane connection for each slot and all other slots are in x8 connection. In some embodiments, three slots can be allocated for uplinks. The three uplink PCIe connections from the slots are directly connected to the uplink PCIe switch on the board. All these slots are facing to the front side of the SEM so that interface cables are accessible. Any of these slots can also be assigned as an end-point slot by a different configuration for the uplink switch by a simple configuration change.

One application of the end-point slot is an SSD card, but it can be also used for other purposes including NIC and H/W accelerator cards. In one embodiment, it is a static configuration. At least one of the uplink slots may be active in the SEM. All other slots may be end-point slots once configured. Any front facing slot of the appliance can be used as an extender card position for another SEM to be connected as additional capacity expansion module. Any NIC card, if installed, should be installed in one of the front facing slots so that the network cables are accessible. To balance the performance and the efficiency budget, in an embodiment, all designated end-point PCIe slots have PCIe x8 lane. Each x8 or x16 PCIe is capable of providing PCIe bifurcation, namely 2×(x4) or 4×(x4) lane configuration with its switch setting. The ports are arranged to enable such capability.

Figure 7:
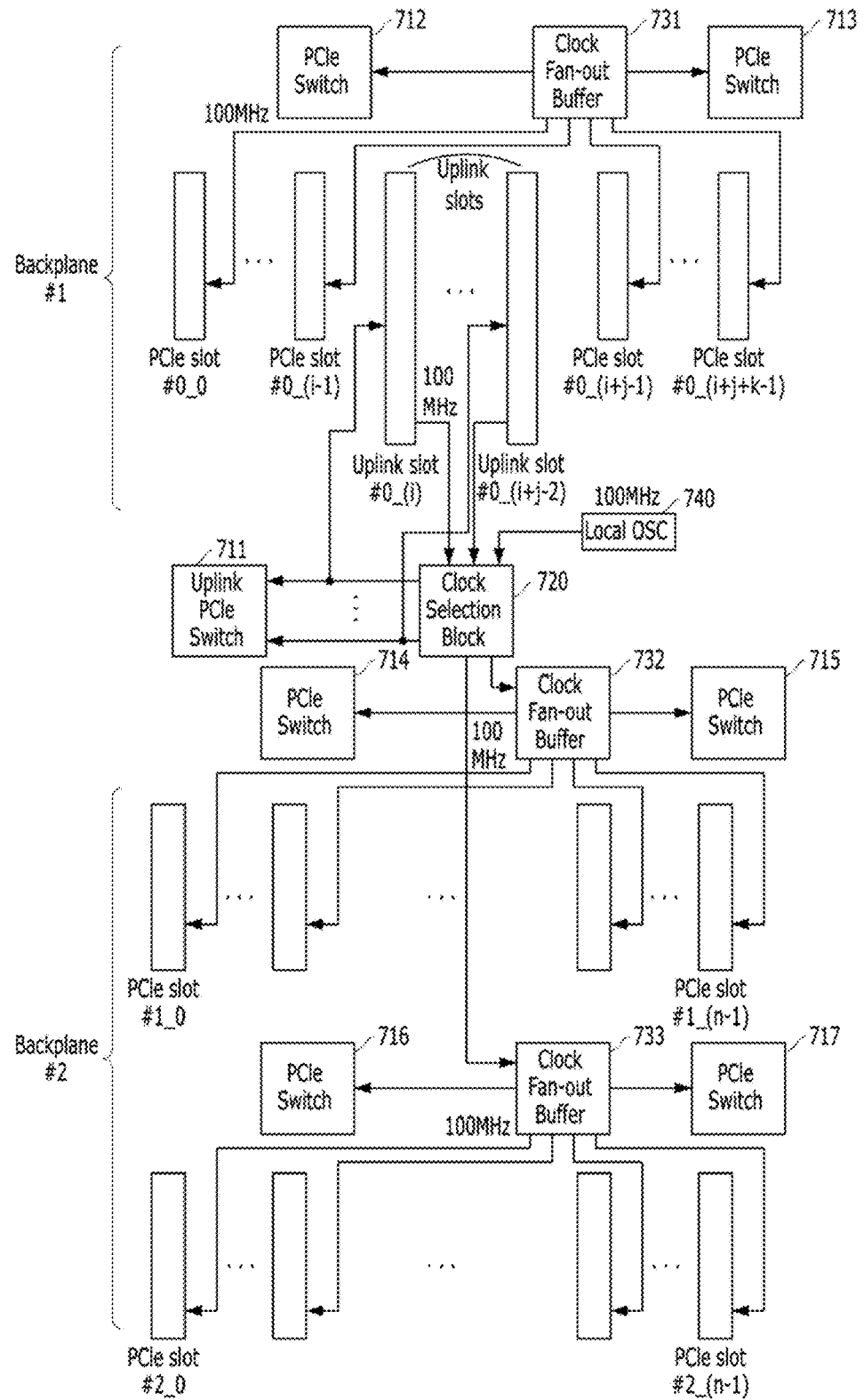
FIG. 7 and FIG. 8 are diagrams illustrating clock distribution circuitry of a storage elements module (SEM) in accordance with embodiments of the present invention.
Figure 8:
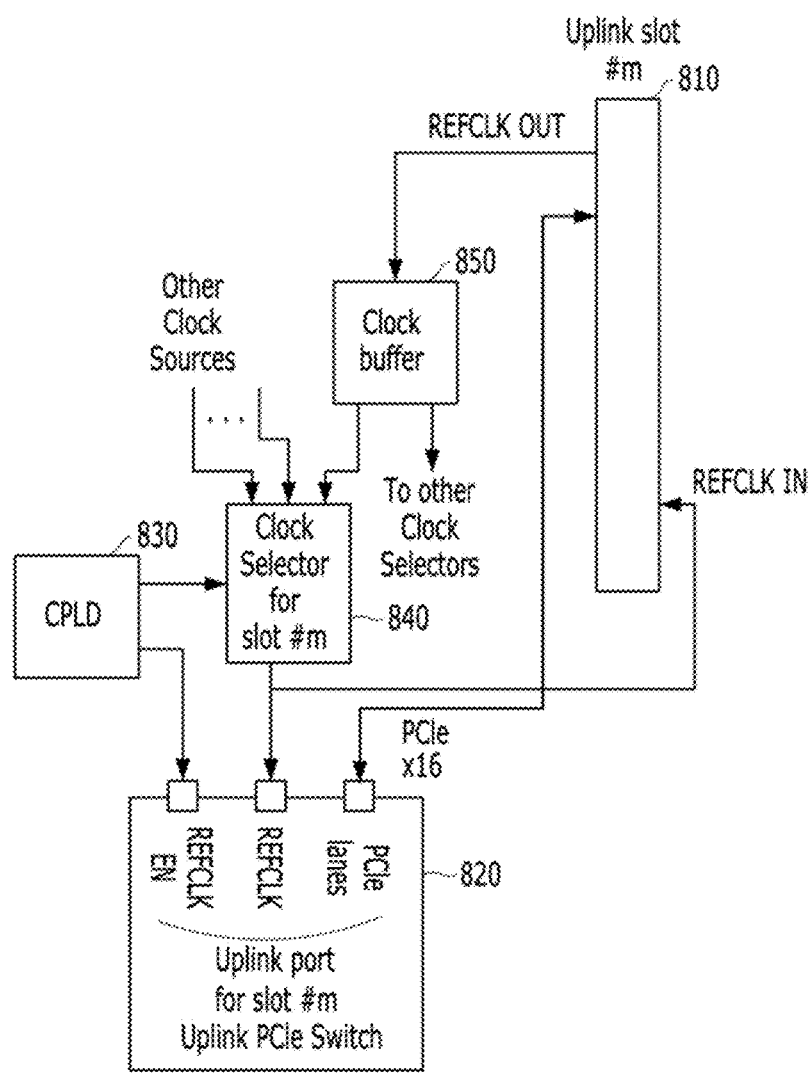

FIG. 7 and FIG. 8 are diagrams illustrating clock distribution circuitry of a storage elements module (SEM) in accordance with embodiments of the present invention.

In these embodiments, the PCIe clocking scheme is applied to the SEM appliance, where Spread Spectrum Clock (SSC) is enabled. Each PCIe slot requires a dedicated reference clock for a link pair both at the sender and at the receiver. Inside the SEM, the communication over the PCIe link for each SSD is its associated switch fabric port and the SSD card in the slot. The reference clock is provided for both the switch fabric device for the port and the card. Except for the designated uplink slot ports, the other PCIe switch fabric devices may use a single clock reference for the entire ports.

When the SEM has only one uplink (not in a virtual switch mode) the reference clock from the uplink may be used as a global reference clock for the SEM.

Referring to FIG. 7, the clock distribution circuitry includes a clock selection block 720, and clock fan-out buffers 731-733. The clock selection block 720 acquires a reference clock (e.g., 100 MHz) from one of the plurality of uplink slots #0_(i) . . . #0_(i+j-2). The clock selection block 720 provides each of the plurality of uplink slots, the buffers 731-733 and uplink PCIe switch 711 with the reference clock. The buffers 731-733 are coupled between the clock selection block 720 and a plurality of PCIe slots #0_0, #0_(i-1), #0_(i+j-1), #0_(i+j+k-1), and provide each of the plurality of PCIe slots with the reference clock. For example, the buffer 731 provides PCIe slots #0_0, #0_(i-1), #0_(i+j-1), #0_(i+j+k-1) with the reference clock. Also, the buffer 731 provides PCIe switches 712, 713 with the reference clock. The buffer 732 provides PCIe slots #1_0, #1_(n-1) with the reference clock. Also, the buffer 732 provides PCIe switches 714, 715 with the reference clock. The buffer 733 provides PCIe slots #2_0, #2_(n-1) with the reference clock. Also, the buffer 733 provides PCIe switches 716, 717 with the reference clock. A local oscillator 740 provides the clock selection block 740 with a clock.

The reference clock for the SEM is optionally obtained from one of the uplink slot(s). The local oscillator 740 may be used when none of the uplink clocks are available. When multiple uplinks are present, only one of the uplink clocks is selected for the rest of the reference clocks other than the designated uplink ports. All down link switch fabric devices rely on a single reference clock, which simplifies the clock configuration.

Referring to FIG. 8, a clock selection block 720 includes a complex programmable logic device (CPLD) 830, a clock selector 840 and a clock buffer 850. The clock buffer 850 receives reference clock REFCLK OUT from an uplink slot 810. The clock selector 840 receives the reference clock from the clock buffer 850. The clock selector 840 provides the uplink slot 810 and an uplink PCIe switch 820 with the reference clock. The CPLD 830 generates an enable signal and outputs the enable signal to the clock selector 840 and the uplink PCIe switch 820. When a reference clock is available from an uplink card, the reference clock for the port in the uplink switch uses, in default, the clock obtained from the slot. The uplink switch ports of the uplink switch fabric device may be configured to accept the port specific reference clock.

Figure 9:
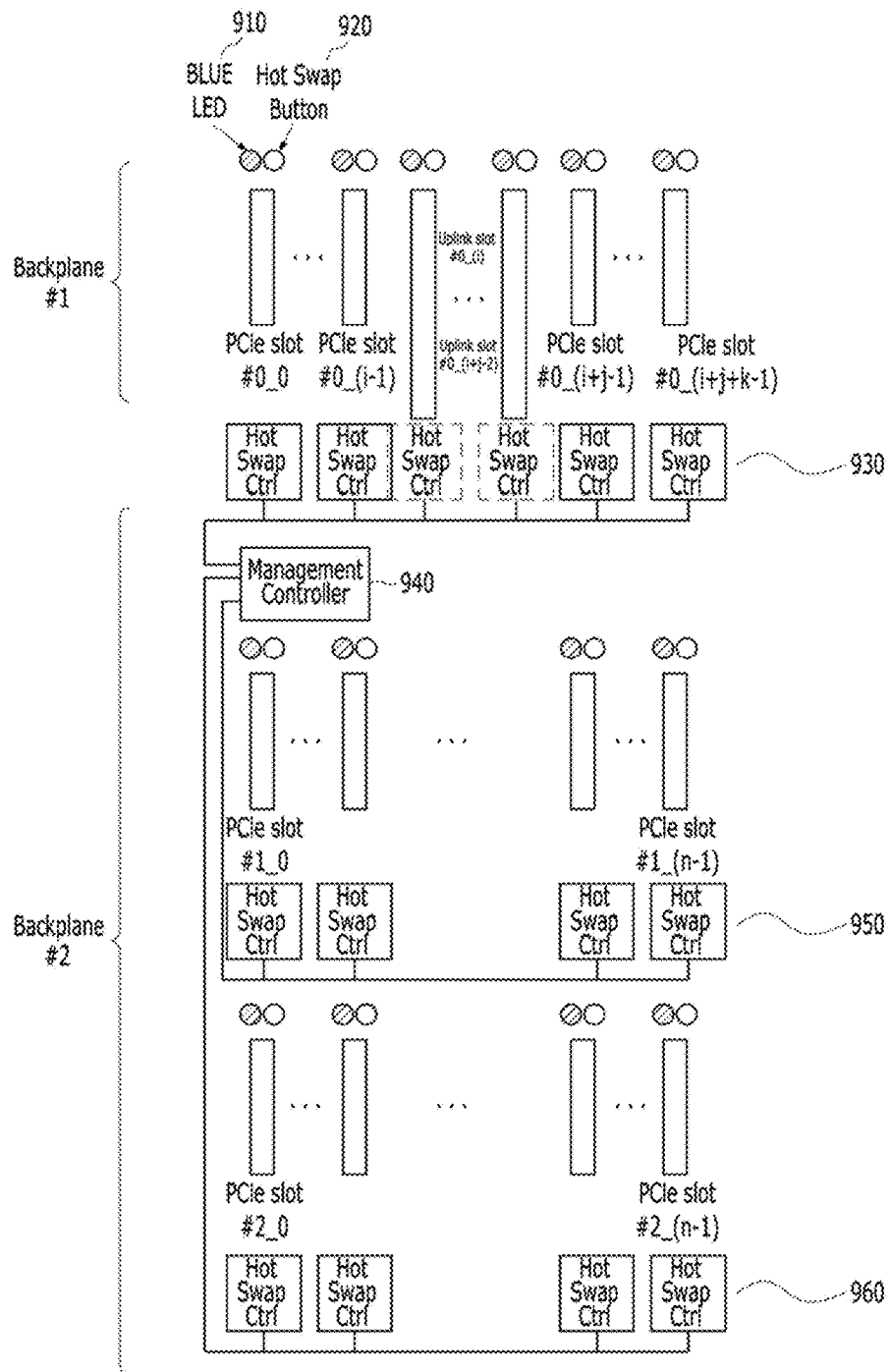
FIG. 9 is a diagram Illustrating a hot swap component of a storage elements module (SEM) in accordance with embodiments of the present invention.

FIG. 9 is a diagram illustrating a hot swap component of a storage elements module (SEM) in accordance with embodiments of the present invention.

In some embodiments, each PCIe slot is hot swappable except the designated uplink(s). For hot swap operations, the SEM Installs the following hardware components: manual switch buttons 920, LEDs 910, hot swap controllers 930, 950, 960 and management controllers 940. Each slot manual switch button 920 is for an operator to start a hot plug procedure before plug-in or pull-out the card from the slot. The LEDs 910, which may be blue LEDs, are an indicator for the operation for the slot. Hot swap controllers 930, 950, 960 for each PCIe slot is dedicated to process the hot plug related signals such as slot power on/off, enable/disable, slot status monitoring and blue LED setting along with the hot swap software stack. The management controller 940 is responsible to orchestrate the whole slot operations with the help of the hot swap controllers 930, 952, 960. For simplicity, detailed signal connections among the components are omitted or simplified. In some embodiments, the LEDs 910 and the hot swap switch buttons 920 are located near to each slot, which are easily accessible to users without ambiguity between slots.

Referring again to FIG. 5, the simplest configuration of the SEM is with a single uplink. In this case, no virtual switch mode setting is necessary. When multiple uplink entities are present, the uplink PCIe switch must be configured for the identical number of the virtual switches to match the number of the uplinks. All the downlink ports of the switch are then mapped to one of these uplinks selectively to form a virtual switch group. The virtual switch mode setting is done via the vendor's switch fabric device configuration manual. Other than the uplink PCIe fabric switch device, all the remaining downlink switch fabric devices do not need any configuration changes because the downlink fabric devices have a single fixed uplink port for each device. The host side software configures the SEM partitioning information accordingly.

To provide the bifurcation mode of the operation for each slot, in some embodiments the port is assigned accordingly by the vendor's switch fabric manual. The rule is that whole x8 or x16 lane connected to a single PCIe slot should be a part of the single port assignment capability. Once single x8 PCIe port is bifurcated into two ports of x4 lanes each, the two PCIe x4 entities (SSDs in SEM end-point application) share the same hot swap operation for the slot. The upper layer software on the host controller side handles the hot swap accordingly.

In some embodiments, the SEM chooses Open Compute Project compliant chassis form factor as an implementation choice for the architecture. The SEM chassis height is in 2 OpenRack Unit (OU). The height enables the standard half-height (low profile) half-length PCIe add-in card form factor SSDs to be a storage expansion unit for the SEM, which is a significant merit for ecosystem support for cost-effectiveness, versatility, efficiency, and multi-vendor support.

Figure 10:
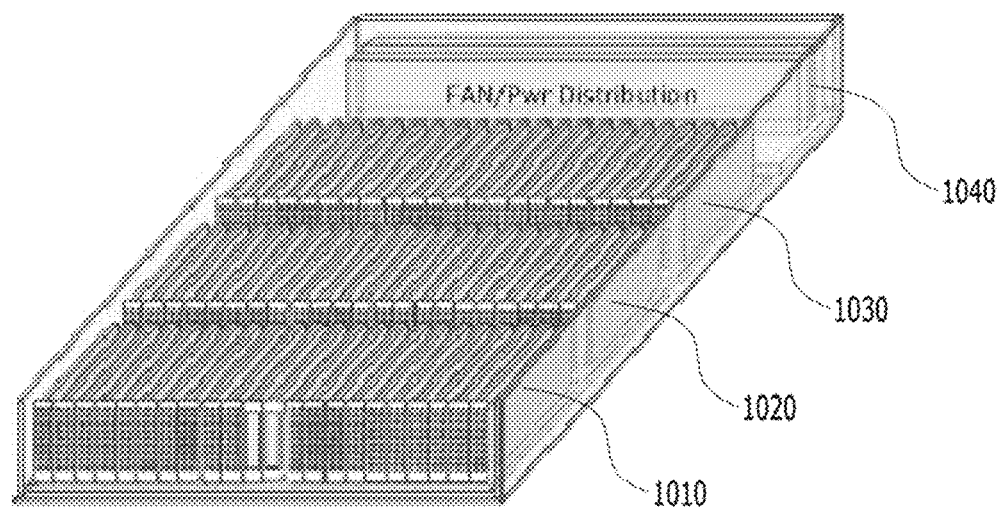
FIG. 10 is a perspective view of a storage elements module (SEM) in accordance with embodiments of the present invention.

FIG. 10 is a perspective view of a storage elements module (SEM) in accordance with embodiments of the present invention, which highlights the slot arrangement in the chassis. The details of the chassis implementation such as the FAN units (number of the units and the locations) and the Power distributions 1040 may vary. In the OCP rack, the power supply is bound by the power feeding scheme of the OCP compliant method, which is through the three 12V bus bars at the rear of the chassis from the rack.

The SEM enclosure 1010-1030 is assembled to the rack, but each of the slots (backplane units) are extractable out of the enclosure to the front side by tray/drawer type architecture which improves field serviceability/replaceability of the cards. This tray type of architecture suitable for optimal in-operation serviceability, is customized with modifications to cope with the PCIe slot based architecture.

Referring again to FIG. 3, in some embodiments, the external SSM may be any off-the-shelf server unit which has at least one extra PCIe gen3 with x8 or x16 lanes. The slot is used for a PCIe extender card to connect to the SEM.

In some embodiments, the PCIe gen3 extender card pair is an off-the-shelf unit. The extender card is a pair of a server and a target card, where the server card sits on the SSM side and the target card resides in the SEM. The form factor of the card is half height, half-length (HHHL) standard PCIe form factor. The target card has some customized pin mappings to exchange PCIe slot specific signals remotely.

Depending on the interconnection types, different types of the network interfaces are installed. In some embodiments, the choice is Ethernet. There are many off-the-shelf standard PCIe gen3 type standard NICs which offer multiple 10 Gb or 40 Gb Ethernet ports in a HHHL PCIe form factor.

In various embodiments, the SEM implementation contains various external management interfaces via the front side faceplate such as an RS232 serial console port, an RJ45 Ethernet management port, and many link LED indicators for the slots. The management controller is responsible for all sideband management information handling.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage node including a storage element module, the storage element module comprising:
    a hierarchical peripheral component interconnect express (PCIe) structure suitable for uplink connection, wherein the hierarchical PCIe structure includes at least one first PCIe switch and at least two second PCIe switches, the at least one first PCIe switch is arranged in a different hierarchical level than the at least two second PCIe switches, the at least one first PCIe switch is coupled to each of the at least two second PCIe switches but not to at least one storage element, and the at least two second PCIe switches are not coupled; and
    at least one connection element operably coupling the at least two second PCIe switches to the at least one storage element,
    wherein one of the at least two second PCIe switches is suitable for coupling with a first group of the at least one storage element; and another of the at least two second PCIe switches is suitable for coupling with a second group of the at least one storage element.

2. The storage node of claim 1, further comprising:
    a PCIe uplink card coupled to the at least one first PCIe switch, suitable for coupling with a server.

3. The storage node of claim 1, wherein comprising:
    a PCIe uplink card coupled to the at least one first PCIe switch, suitable for coupling with a storage server module.

4. The storage node of claim 1, further comprising:
    a micro storage server module in a PCIe card form factor coupled to the at least one first PCIe switch.

5. The storage node of claim 1, further comprising:
    other connection elements suitable for coupling with at least one network interface card (NIC) in a PCIe card form factor.
6. The storage node of claim 1, further comprising:
    other connection elements suitable for coupling with at least one hardware (H/W) accelerator card in a PCIe card form factor.
7. The storage node of claim 1, wherein the at least two second PCIe switches are further suitable for coupling with at least one network interface card (NIC).
8. The storage node of claim 1, further comprising:
    a plurality of uplink slots for coupling with the at least one first PCIe switch; and
    a plurality of PCIe slots for coupling with the at least two second PCIe switches.
9. A storage node including a storage element module, the storage element module comprising:
    a hierarchical peripheral component interconnect express (PCIe) structure suitable for uplink connection, wherein the hierarchical PCIe structure includes at least one first PCIe switch and at least two second PCIe switches, the at least one first PCIe switch is arranged in a different hierarchical level than the at least two second PCIe switches, the at least one first PCIe switch is coupled to each of the at least two second PCIe switches but not to at least one storage element, and the at least two second PCIe switches are not coupled;
    at least one connection element operably coupling the at least two second PCIe switches to the at least one storage element;
    a plurality of uplink slots for coupling with the at least one first PCIe switch; and
    a plurality of PCIe slots for coupling with the at least two second PCIe switches,
    wherein the plurality of uplink slots and a portion of the plurality of PCIe slots are arranged in a first backplane, and a remaining portion of the plurality of PCIe slots is arranged in a second plane.
10. The storage node of claim 9, wherein each of the first and second planes comprises a connector suitable for connecting each other.
11. The storage node of claim 8, further comprising:
    a clock selection block suitable for acquiring a reference clock from one of the plurality of uplink slots; and
    at least one buffer coupled between the clock selection block and the plurality of PCIe slots, suitable for providing each of the plurality of PCIe slots with the reference clock.
12. The storage node of claim 11, wherein the clock selection block is further suitable for providing each of the plurality of uplink slots and the at least one first PCIe switch with the reference clock.
13. The storage node of claim 11, wherein the at least one buffer is further suitable for providing the at least two second PCIe switches with the reference clock.
14. The storage node of claim 11, further comprising:
    a local oscillator suitable for providing the clock selection block with a clock.
15. A storage node including a storage element module, the storage element module comprising:
    a hierarchical peripheral component interconnect express (PCIe) structure suitable for uplink connection, wherein the hierarchical PCIe structure includes at least one first PCIe switch and at least two second PCIe switches, the at least one first PCIe switch is arranged in a different hierarchical level than the at least two second PCIe switches, the at least one first PCIe switch is coupled to each of the at least two second PCIe switches but not to at least one storage element, and the at least two second PCIe switches are not coupled;
    at least one connection element operably coupling the at least two second PCIe switches to the at least one storage element;
    a plurality of uplink slots for coupling with the at least one first PCIe switch; and
    a plurality of PCIe slots for coupling with the at least two second PCIe switches,
    wherein each of the plurality of uplink slots and the plurality of PCIe slots is hot swappable.
16. The storage node of claim 15, further comprising:
    a switch button suitable for initiating a hot swap operation for one of the plurality of uplink slots and the plurality of PCIe slots; and
    a controller suitable for controlling the hot swap operation.
17. The storage node of claim 16, further comprising:
    an indicator suitable for indicating the hot swap operation.
18. The storage node of claim 8, wherein the plurality of uplink slots and the plurality of PCIe slots are arranged in open compute project (OCP) compliant chassis.
19. The storage node of claim 8, wherein the plurality of uplink slots and the plurality of PCIe slots are extractable out of an enclosure of the storage element module.

* * * * *